UNITED STATES PATENT OFFICE.

PERCY C. C. ISHERWOOD, OF LEYTONSTONE, ENGLAND.

TREATMENT OF REFRACTORY ZINC-LEAD ORES.

1,011,962.　　Specification of Letters Patent.　　Patented Dec. 19, 1911.

No Drawing.　　Application filed April 8, 1910.　Serial No. 554,259.

*To all whom it may concern:*

Be it known that I, PERCY CLAUDE CAMERON ISHERWOOD, Ph. D., chemist, a subject of the King of Great Britain and Ireland, residing at Hazelwood, Forest Glade, Leytonstone, England, have invented certain new and useful Improvements Relating to the Treatment of Refractory Zinc-Lead Ores, of which the following is a specification.

This invention relates to the treatment of refractory zinc lead ores and more especially for the recovery of the zinc compounds contained in them.

According to the invention the ore after grinding to a suitable degree of fineness is roasted advantageously under conditions in which the oxidizable sulfids in the ore are converted partly into sulfate and partly into oxid and under conditions which give a maximum yield of sulfate and until no free sulfid remains; and according to the invention I leach it with a solution of sulfuric acid at high temperature and pressure as hereinafter described.

Hitherto the use of sulfuric acid for the extraction of zinc from ores containing iron has been open to the objection that a portion of the iron is dissolved along with the zinc when sufficient acid has been used for the complete solution of the latter.

When less than the theoretical quantity of acid necessary for the solution of the zinc oxid is used, much less iron is dissolved but in this case under ordinary conditions a considerable amount of zinc is left in the residue which not only is wasteful from the point of view of yield of zinc but also prejudicially interferes with the smeltability of the ore for the obtainment of the other metals contained therein.

I have discovered that the solubility of zinc oxid in solutions of zinc sulfate is increased at temperatures above the boiling point of solutions of the latter under atmospheric pressure such as correspond to pressures of say from 50 to 200 lbs. per square inch. As a result of this fact a practically complete removal of zinc can be made free from contamination with iron with less than the theoretical quantity of sulfuric acid necessary to convert the whole of the zinc oxid into zinc sulfate and conversely should excess of sulfuric acid have been used and iron be found in the zinc sulfate solution it can readily be removed by a subsequent treatment with more ore under the described leaching conditions.

According to the invention the ore is extracted with a solution, containing less than the theoretical amount of sulfuric acid necessary for the complete solution of the zinc oxid contained therein when under ordinary conditions of temperature and pressure, under conditions of high temperature and pressure so that practically the whole of the zinc oxid is extracted, the excess of zinc oxid dissolving in the zinc sulfate under the conditions named. If while still under pressure this solution is separated from the undissolved portions of the ore, the former on cooling separates the excess of zinc oxid in the form of a basic sulfate.

In carrying the invention into effect in the treatment of refractory zinc-lead sulfid ores such as that of the "Broken Hill" or similar deposits I grind the ore to a convenient degree of fineness and I start the roasting which is effected in a current of air, at a dull red and even heat. The oxidizable sulfids of zinc, lead, iron and copper which may be present are thus converted partly into sulfate and partly into oxid. The roasted ore is then treated with a solution of sulfuric acid as described at high temperatures and pressure (for example from 50 to 200 pounds per square inch) in a lead lined or enameled vessel or in a vessel of any other material that would not be acted upon by the substances present. Lower pressures and temperature may be used but the extraction is not so complete. After the treatment the charge still under pressure is filtered and zinc compounds are precipitated from the filtrate in cooling. The residual ore may then be treated for the recovery of the other compounds contained in it.

What I claim as my invention and desire to secure by Letters Patent is:—

1. A process of treating refractory zinc lead ores consisting in roasting the ores and leaching the ores with sulfuric acid at a high temperature and pressure.

2. A process of treating refractory zinc lead ores consisting in roasting the ores and leaching the ores with a solution containing less than the theoretical amount of sulfuric acid necessary for the complete solution of the zinc oxid contained in the ore when under ordinary conditions of temperature and pressure, at a high temperature and pressure.

3. A process of treating refractory zinc lead ores consisting in roasting the ores and leaching the ores at a high temperature and pressure of from 50 to 200 lbs. per square inch.

4. A process of treating refractory zinc lead ores consisting in roasting the ores and leaching the ores with sulfuric acid at a high temperature and pressure of from 50 to 200 lbs. per square inch.

5. A process of treating refractory zinc lead ores consisting in roasting the ores and leaching the ores with a solution containing less than the theoretical amount of sulfuric acid necessary for complete solution of the zinc oxid contained in the ore, when under ordinary conditions of temperature and pressure, at a high temperature and pressure of from 50 to 200 lbs. per square inch.

6. A process of treating refractory zinc lead ores consisting in roasting the ores and leaching the ores at a high temperature and pressure, filtering the charge under pressure and partially precipitating the zinc compounds by cooling.

7. A process of treating refractory zinc lead ores consisting in roasting the ores and leaching the ores with sulfuric acid at a high temperature and pressure, filtering the charge under pressure and partially precipitating the zinc compounds by cooling.

8. A process of treating refractory zinc lead ores consisting in roasting the ores and leaching the ores with a solution containing less than the theoretical amount of sulfuric acid necessary for the complete solution of the zinc oxid contained in the ore when under ordinary conditions of temperature and pressure at a high temperature and pressure, filtering the charge under pressure and partially precipitating the zinc compounds by cooling.

9. A process of treating refractory zinc lead ores consisting in roasting the ores and leaching the ores at a high temperature and pressure of from 50 to 200 lbs. per square inch, filtering the charge under pressure and partially precipitating the zinc compounds by cooling.

10. A process of treating refractory zinc lead ores consisting in roasting the ores and leaching the ores with sulfuric acid at a high temperature and pressure of from 50 to 200 lbs. per square inch, filtering the charge under pressure and partially precipitating the zinc compounds by cooling.

11. A process of treating refractory zinc lead ores consisting in roasting the ores and leaching the ores with a solution containing less than the theoretical amount of sulfuric acid necessary for the complete solution of the zinc oxid contained in the ore when under ordinary conditions of temperature and pressure at a high temperature and pressure of from 50 to 200 lbs. per square inch, and filtering the charge under pressure and partially precipitating the zinc compounds by cooling.

In testimony whereof I have hereunto signed my name to this specification in the presence of two subscribing witnesses.

PERCY C. C. ISHERWOOD.

Witnesses:
FREDERICK SQUIRE,
H. D. JAMESON.